No. 728,718. PATENTED MAY 19, 1903.
C. E. HUTCHINGS & J. A. ROBERTSON.
FLAT FORM PHOTOGRAPHIC FILM PACKAGE.
APPLICATION FILED OCT. 18, 1902.
NO MODEL. 3 SHEETS—SHEET 1.
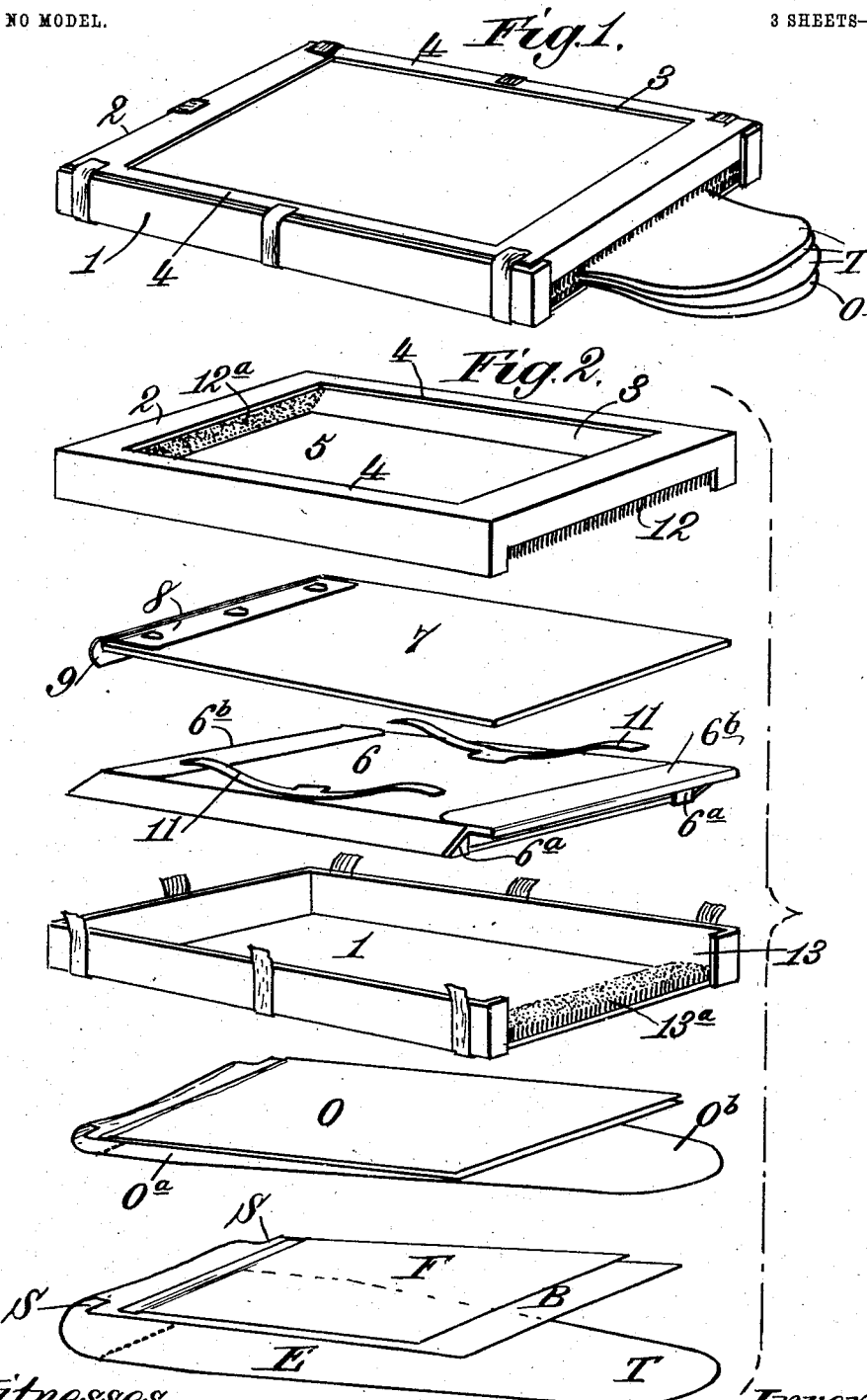

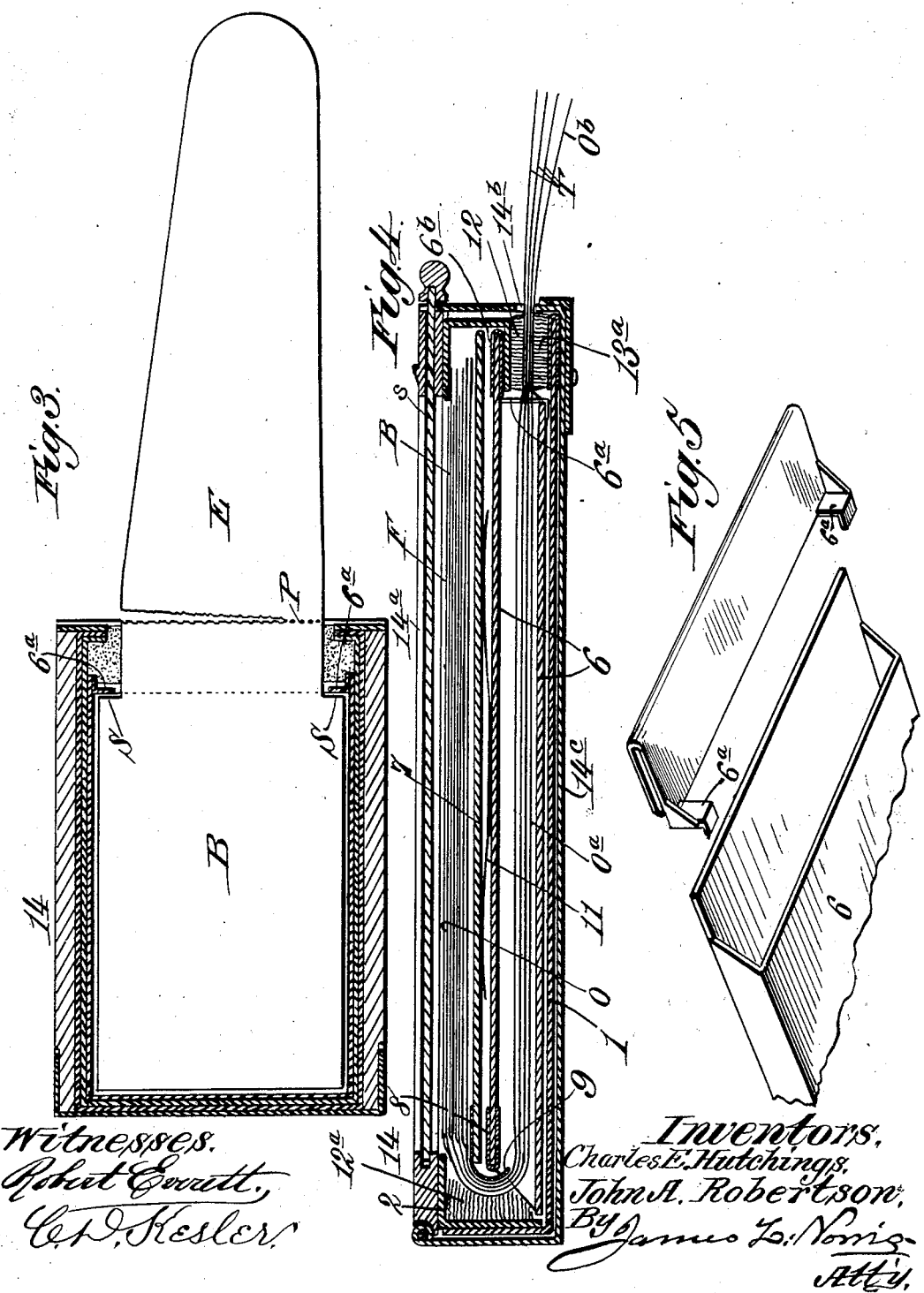

No. 728,718. PATENTED MAY 19, 1903.
C. E. HUTCHINGS & J. A. ROBERTSON.
FLAT FORM PHOTOGRAPHIC FILM PACKAGE.
APPLICATION FILED OCT. 18, 1902.
NO MODEL. 3 SHEETS—SHEET 3.
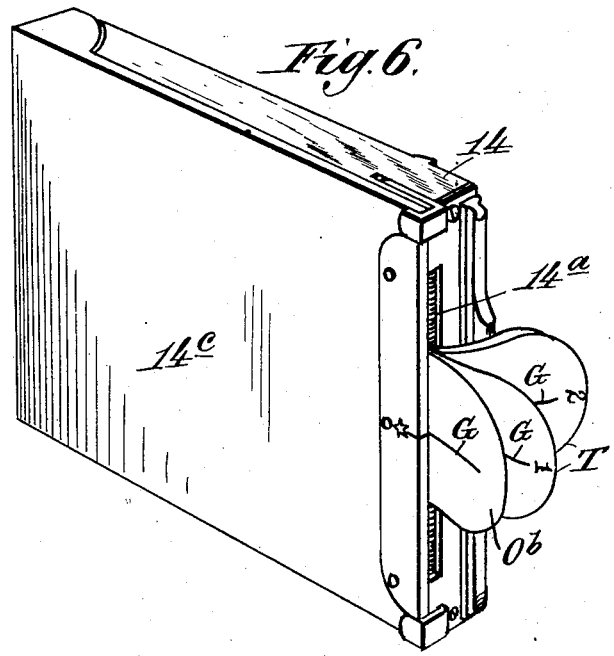
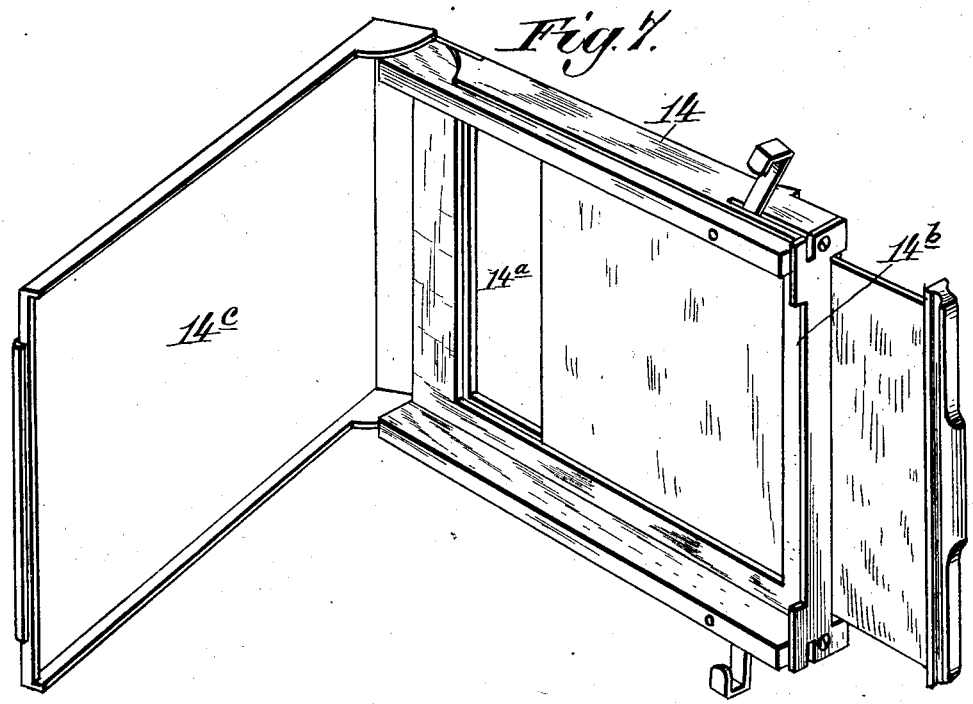
Witnesses.
Robert Everett.
C. D. Kesler.
Inventors.
Charles E. Hutchings.
John A. Robertson.
By James L. Norris
Att'y.

No. 728,718. Patented May 19, 1903.

UNITED STATES PATENT OFFICE.

CHARLES E. HUTCHINGS AND JOHN A. ROBERTSON, OF ROCHESTER, NEW YORK, ASSIGNORS TO ROCHESTER OPTICAL & CAMERA CO., OF ROCHESTER, NEW YORK, A CORPORATION OF NEW YORK.

FLAT-FORM PHOTOGRAPHIC-FILM PACKAGE.

SPECIFICATION forming part of Letters Patent No. 728,718, dated May 19, 1903.

Application filed October 18, 1902. Serial No. 127,801. (No model.)

*To all whom it may concern:*

Be it known that we, CHARLES E. HUTCHINGS and JOHN A. ROBERTSON, citizens of the United States, residing at Rochester, in the county of Monroe and State of New York, have invented new and useful Improvements in Flat-Form Photographic-Film Packages, of which the following is a specification.

This invention relates to improvements in flat-form daylight-loading packages of photographic films, and has for its object to provide a flat film-package so constructed and arranged that the contained films are thoroughly protected from the entrance of light, to provide a flat film-package of such character that its cost is practically nominal, to the end that when a package of films is sold and used by the purchaser it may be cast away without appreciable loss, to provide a flat film-package having a movable film follower-plate to conduct the film to be exposed to and maintain it in a smooth condition in the focal plane, to provide a flat film-package with a storage-chamber in which the exposed films are maintained close together and in a flat condition, and, finally, to improve the arrangement, construction, and operation of flat-film packages.

To the ends stated the invention consists in a flat film-package constructed as hereinafter described, reference being made to the accompanying drawings, illustrating the best known form of our invention.

That which is claimed as new is set forth in the appended clauses of the claim.

In the accompanying drawings, Figure 1 is a perspective view of a flat-form film-package constructed according to our invention. Fig. 2 is a view showing the several parts thereof separated, together with a representation of one of the films and of the covering-sheet. Fig. 3 is a view, partly in section, showing a film withdrawn into the exposed-film storage-chamber. Fig. 4 is a longitudinal sectional view of the package with a series of films arranged therein and the package inclosed in an adapter. Fig. 5 is a view illustrating a portion of the storage-chamber for the exposed films with the sheet-metal stiffener thereof detached and illustrating the stop-abutments for controlling the limit of movement of the films. Fig. 6 is a perspective view illustrating the package inclosed in an adapter, and Fig. 7 is a perspective view of a suitable form of adapter for containing the package of films.

To the better understanding of the package, the character of film and its appurtenances, as shown in Fig. 2 of the drawings, will first be described. The film F is, as usual, flexible and may be made up of any approved composition. It will be made up of the sizes and of the shapes usual in the manufacture of plates. It is mounted upon backing-sheet B, preferably opaque, having an extension E, terminating in a film-manipulating tab T, and is provided with a stop-shoulder S. This is a manner of film and appurtenances which we have found suitable for use in our improved package; but we do not confine our invention to a package containing films having all the features referred to.

The several elements of the package are intended to be constructed of pasteboard or other suitable economical material, so that the package after use may be thrown away. While this is a very valuable practical consideration, yet in respect of the structural, elemental, and operative characteristics of our improved package we do not limit our invention to the material of which the package is made up.

In the drawings the reference-numeral 1 designates the rear section of the package, and 2 the front section, which, as shown, when the package is assembled is telescoped into the rear section and secured thereto, for example, by adhesive strips. It is designed that the package will be placed on the market in a commercial form inclosed within a suitable wrapper or closure of paper or other suitable material. The front section of the package is provided with a film exposure-opening 3, surrounded by film-confining flanges 4, that engage the marginal edges of the film to support the same evenly and smoothly in the focal plane. Within the front section of the package 2 a chamber 5 is provided to receive the unexposed films and their protecting back-sheet B in a flat condition, as illustrated, together with an opaque cover-sheet O, arranged in advance of the series of films and closing the exposure-opening of the package. In the rear section of the package is disposed an exposed-film storage-chamber 6, the capacity of which is sufficient to receive the predetermined number of films and their backing-sheets which constitute the series inclosed in a given package and maintain them in a flat condition close together in compact form. The edges of this storage-chamber when constructed of pasteboard, as illustrated, are reinforced by sheet-metal stiffeners $6^b$, which afford rigidity and stability of form thereto.

The numeral 7 indicates a bodily-movable film follower-plate which is commensurate with the area of the films—that is to say, operates against practically the entire width and length of the film, so that all parts of the films as they are successively in position for exposure are held by the film follower-plate accurately in the focal plane, avoiding liability of any part or parts of the films bending or buckling out of the focal plane.

The movable film-follower 7 is, in the form shown in the drawings, provided at its lower edge with a metallic stiffener 8 and a curved rail 9, formed of a continuation of said stiffener, which serves to facilitate the movement of the films from the exposure-chamber to the storage-chamber through a passage 10. This curved rail when the film-follower is arranged against the adjacent wall of the storage-chamber, together with the extensions of the film backing-sheets, practically closes the lower opening of the storage-chamber and prevents the passage of light at this point. Springs 11 are arranged on the wall of the storage-chamber and engage the film-follower, as shown, pressing the same against the series of unexposed films, whereby the latter are confined between said film-follower and the flanges of the front section of the package and maintained in a close compact series and in a flat smooth condition. Secured to the front section of the package is a light-excluding strip 12, which when the parts are assembled is disposed behind the film-follower and a projecting ledge of the storage-chamber, which rests against the said strip 12 and serves to retain it in proper position in front of the tab-passage $14^b$.

Coöperating with the strip 12 to prevent entrance of light through the tab-passage $14^b$ is another light-excluding strip $13^a$, secured along the edge of the rear casing. These two strips closely engage the opposite sides of the tabs or film backing-sheets, as best shown in Fig. 4, and effectually prevent entrance of light to the films from the passage $14^b$. We prefer that the light-excluding strips be made of long fiber plush, as this has been found satisfactory in practice.

An auxiliary light-excluding strip $12^b$ is provided along the lower edge of the front section of the package to protect against passage of light at that point and to add to the assurance that the films shall be effectually protected from the influence of light.

The storage-chamber 6 is provided at its upper part with stop-abutments $6^a$, which intercept the path of movement of the film backing-sheets, while allowing the manipulating-tabs to pass between them and which are preferably and as shown formed on the appropriate stiffener $6^b$ and which engage the stop-shoulders S of the film backing-sheets and serve to limit the movement of the several films within the package, at which stage the exposed films will be safely housed in the storage-chamber. The rear section of the package is provided with a passage 13, through which the film-manipulating tabs are exposed and through which the extensions of the backing-sheets are drawn in moving the films after exposure from the exposing-chamber to the exposed-film storage-chamber, and adjacent this passage is arranged the before-mentioned light-excluding strip $13^a$.

In practice a series of films provided with back-sheets having extensions terminating in film-manipulating tabs are arranged in the exposure-chamber of the package in front of the film-exposing opening 3 in the front section together with an opaque covering-sheet O, conforming in shape with that of the films and their backing-sheets and provided with an extension $O^a$ and a manipulating-tab $O^b$, similar to the corresponding appurtenances of the films. The extensions are passed beneath the curved rail of the film-follower through the exposed-film storage chamber with the film-manipulating tabs and the cover-sheet-manipulating tab projecting outside the package within reach of the operator. When thus assembled, all avenues for the entrance of light are closed by the light-excluding strips 12, $12^a$, and $13^a$. The package may be inserted into a camera or, for example, into an adapter 14, illustrated in the drawings, in the manner shown. This adapter is constructed as to its exterior formation in simulation of the formation of a plate-holder and is adapted to be inserted in cameras of well-known construction in the same manner that a plate-holder is inserted therein. The adapter is provided with an exposure-opening $14^a$ and a passage $14^b$ for the film-manipulating tabs and a cover $14^c$ to confine the package in place in the adapter. While we believe the package will best be used in connection with an adapter, we do not confine ourselves to an adapter, as this invention relates to the package of films irrespective of the manner of its coöperative corporation into a camera.

In describing the use of the improved film-package it will be assumed that it is properly arranged in an adapter and the latter inserted in the camera with the exposure-opening 3 in register with the exposure-opening 14ª of the adapter. When thus assembled and after withdrawal of the slide s, the protecting-sheet O for the series of films will be outermost, closing the said registering exposure-openings. The operator will grasp the manipulating-tab of the protecting-sheet and by drawing thereon withdraw the said sheet into the storage-chamber, leaving the first film of the series ready to be exposed, after which this film is withdrawn into the storage-chamber by drawing upon its manipulating-tab, and after exposure the succeeding films will be drawn into the storage-chamber by means of their respective manipulating-tabs, the tabs being numbered in sequence to indicate to the operator the proper order in which they should be actuated.

The film follower-plate advances progressively, bearing firmly against the films, holding them in a flat smooth condition and forcing them into and maintaining them in the proper focal plane. During the forward movement of the film-follower the curved rail advances in the lower opening of the storage-chamber, increasing the passage therein to accommodate the entrance of the successive films into said chamber.

The tabs and extensions of the backing-sheets when withdrawn from the package and the adapter when the latter is employed are preferably torn off along the line of perforations P formed therein, so that the exposed films and the protective part of the backing-sheets thereof are stored within the storage-chamber and entirely housed therein. To facilitate the accurate withdrawal of the tabs and movement of the films, the former are provided with guide-lines, such as shown at G, and the adapter when the latter is used or a corresponding part when the latter is not used provided with an indicating-mark along which the guide-line is to be drawn, so as to enable the film to be drawn in an accurate straight line from the exposing position to the storage-chamber.

When all the films of the package have been exposed, the film-follower closes the exposure-opening of the package and the films are completely and safely housed in the storage-chamber protected from the influence of light, and the package can be removed from the camera and preserved until ready for development or can be inclosed in its original wrapper or closure and mailed or otherwise sent to a place of development, if desired.

Packages constructed according to our invention are extremely light and economical and may be carried about in the pocket of the user as plate-holders are now commonly carried, a package of a dozen films occupying no more space than an ordinary double plate-holder and being much less in weight.

Being effectually protected from the influence of light, the package may be carried in the pocket with safety and loaded into the adapter or camera construction and unloaded therefrom in daylight without danger of injury to the films.

Having thus described the invention, what we claim is—

1. A photographic-film package having communicating chambers for unexposed and exposed films and a bodily-movable film follower-plate arranged in said package.

2. A package for photographic films having communicating chambers for unexposed and exposed films, and a bodily-movable film follower-plate arranged in said package and provided with a curved rail to facilitate the movement of the films.

3. A package for photographic films having a storage-chamber for exposed films provided with stop-abutments which intercept the path of movement of the film backing-sheets.

4. A package for photographic films having communicating chambers for unexposed and exposed films, and a bodily-movable film follower-plate arranged in said package and provided with a curved rail entering and partially closing the entrance-opening of the exposed film-chamber.

5. A package for photographic films having communicating chambers for unexposed and exposed films, a bodily-movable film follower-plate, and springs carried by the exposed film-chamber in operative engagement with the film follower-plate.

6. A package for photographic films comprising front and rear sections provided with light-excluding strips and having an unexposed film-chamber, a chamber for exposed films arranged within the front and rear sections, a bodily-movable film follower-plate, and means for moving the film follower-plate progressively.

7. In a package for photographic films, the combination with front and rear sections and having a film-manipulating-tab passage, of light-excluding elements carried by said sections, said light-excluding elements projecting toward each other from opposite sides of the film-manipulating-tab passage and operatively closing said passage against the entrance of light.

8. In a package for photographic films having communicating chambers for unexposed and exposed films, a bodily-movable film follower-plate, a film-manipulating-tab passage, and light-excluding elements arranged behind the film follower-plate and closing said passage.

In testimony whereof we have hereunto set our hands in presence of two subscribing witnesses.

CHARLES E. HUTCHINGS.
JOHN A. ROBERTSON.

Witnesses:
MARTIN FREIDELL,
BESSIE L. DENNY.